(12) United States Patent
Jackson et al.

(10) Patent No.: US 6,455,637 B1
(45) Date of Patent: Sep. 24, 2002

(54) CROSSLINKED COMPOSITIONS CONTAINING SILANE-MODIFIED POLYOLEFINS AND POLYPROPYLENES

(75) Inventors: Peter Jackson, Toronto; Robert Edward Steele, Richmond Hill; Amarjit Tathgur, Brampton; Marcus P. Heydrich, Mississauga; Dilip K. Tailor, Brampton, all of (CA)

(73) Assignee: ShawCor Ltd., Toronto (CA)

( * ) Notice: Subject to any disclaimer, the term of this patent is extended or adjusted under 35 U.S.C. 154(b) by 0 days.

(21) Appl. No.: 09/705,777

(22) Filed: Nov. 6, 2000

(30) Foreign Application Priority Data

Nov. 24, 1999 (CA) .............................................. 2290318

(51) Int. Cl.⁷ ...................... C08L 23/00; C08L 23/04; C08L 25/02
(52) U.S. Cl. ...................... 525/191; 525/192; 525/197; 525/198; 525/209; 525/221; 525/222; 525/240; 525/241
(58) Field of Search ................................. 525/191, 192, 525/197, 198, 209, 221, 222, 240, 241

(56) References Cited

U.S. PATENT DOCUMENTS

| | | |
|---|---|---|
| 3,646,155 A | 2/1972 | Scott |
| 4,189,392 A | 2/1980 | Penneck et al. |
| 4,329,536 A | 5/1982 | Sato et al. |
| 4,413,066 A | 11/1983 | Isaka et al. |
| 4,464,425 A | 8/1984 | Voigt et al. |
| 4,558,094 A | 12/1985 | Deguchi et al. |
| 4,618,654 A | 10/1986 | Schmidtchen et al. |
| 4,702,868 A | 10/1987 | Pontiff et al. |
| 4,870,111 A | 9/1989 | Donuiff et al. |
| 4,978,436 A | 12/1990 | Kelly |
| 5,026,736 A | 6/1991 | Pontiff |
| 5,112,919 A | 5/1992 | Furrer et al. |
| 5,169,900 A | 12/1992 | Gudelis |
| 5,246,783 A | 9/1993 | Spenadel et al. |
| 5,461,110 A | 10/1995 | Arthurs et al. |
| 5,589,519 A | 12/1996 | Knaus |
| 5,604,033 A | 2/1997 | Arthurs et al. |
| 5,605,937 A | 2/1997 | Knaus |
| 5,741,858 A | 4/1998 | Brann et al. |
| 5,756,582 A | 5/1998 | Mori |
| 5,763,498 A | 6/1998 | Knaus |
| 5,859,076 A | 1/1999 | Kozma et al. |
| 5,883,144 A | 3/1999 | Bambara et al. |
| 5,883,145 A | 3/1999 | Hurley et al. |
| 5,929,129 A | 7/1999 | Feichtinger |
| 5,932,659 A | 8/1999 | Bambara et al. |
| 5,994,474 A | 11/1999 | Wey et al. |
| 6,004,647 A | 12/1999 | Bambara et al. |

FOREIGN PATENT DOCUMENTS

| | | |
|---|---|---|
| GB | 2 093 760 | 9/1982 |
| WO | WO98/23687 | 6/1998 |

*Primary Examiner*—Nathan M. Nutter
(74) *Attorney, Agent, or Firm*—Ridout & Maybee LLP

(57) ABSTRACT

A moisture-crosslinkable polypropylene material, comprising silane-grafted polyolefin or olefin-silane copolymer and non silane-modified polypropylene homopolymer or copolymer; and coatings or insulations, including heat-shrinkable coatings and insulations, prepared therefrom. The coating material is formed by a process comprising: (a) reacting polyolefin with a silane in the presence of a free-radical initiator to form a silane-grafted polyolefin, or copolymerizing a polyolefin with silane; (b) preparing a mixture of the silane-modified polyolefin prepared in (a) with polypropylene homopolymer or copolymer, and a silanol condensation catalyst; (c) forming the coating or insulating material by melt processing the mixture formed in step (b); and (d) crosslinking the coating or insulating material by exposing it to moisture, preferably at an elevated temperature.

20 Claims, No Drawings

CROSSLINKED COMPOSITIONS CONTAINING SILANE-MODIFIED POLYOLEFINS AND POLYPROPYLENES

FIELD OF THE INVENTION

The present invention relates to polymeric compositions and their uses, and more particularly to crosslinked compositions of silane-modified polyolefins blended with polypropylene homopolymers and/or copolymers, and their uses as heat shrinkable coating and insulating materials, and as wire and cable insulation materials, but not necessarily restricted thereto.

BACKGROUND OF THE INVENTION

Polypropylenes are ideally suited to the preparation of coatings and insulations designed for use at operating temperatures in excess of those that can be withstood by other polyolefins, for example, polyethylene, which exhibit lower softening and melting temperatures. Other attractive features are their high rigidity and toughness, low cost and relatively low density. Applications for these coatings and insulations would include polymeric insulation for electrical wires and cables, and heat-shrinkable protective sleeves for high-temperature, transmission pipelines, or applications requiring greater toughness and rigidity than is afforded by polyethylene-based systems. For example, heat-shrinkable sleeves used for the corrosion protection of high temperature pipeline joints are, required to maintain dimensional stability and integrity at the operating temperature of the pipeline. Hence it is necessary to use a material, such as polypropylene, with a softening temperature or melting point high enough to prevent creeping or sagging of the sleeve from the pipe at the continuous operating temperature of the pipeline. Also, in order to maximise heat-resistance and physical properties, it is necessary to impart some thermoset characteristic to the material. This is done by crosslinking the polymer to some required degree. Crosslinking is also necessary for the production of heat-shrinkable articles to impart controlled shrinkage characteristics. The aim of this invention is to provide a means of preparing crosslinked, predominantly polypropylene-based materials, which can be used in the applications described, but not necessarily restricted thereto.

Polymers in which the predominant chain units comprise an alpha olefin, such as polypropylenes, are known to preferentially depolymerise when exposed to free radicals required to effect crosslinkng. Hence, unlike similar materials, namely polyolefins such as polyethylenes and copolymers of polyethylene, it is not possible to crosslink polypropylene-based materials to satisfactory levels, as is required, for example, in the production of wire and cable insulations, and heat-shrinkable articles, such as tubing, sheet, and moulded shapes, by using standard free-radical methods of crosslinking, such as electron beam irradiation or peroxide initiated crosslinking.

It is also a well known process to produce crosslinked polyolefins, and articles made therefrom, using a process for grafting a vinyl silane onto an olefin homopolymer or copolymer such as is described in U.S. Pat. No. 3,646,155. Alternatively, the vinyl silane may be copolymerised directly with olefin monomers as described in U.S. Pat. No. 4,413,066, for example. Since these methods requires a free-radical generator to initiate the grafting reaction, polypropylene is also unsuited to this method of crosslinking. Hence, it is therefore necessary to resort to alternative methods to crosslink polypropylene.

SUMMARY OF THE INVENTION

The present invention overcomes the above-discussed problems of the prior art by providing moisture crosslinkable compositions of silane-modified polyolefins, typically of polyethylenes and copolymers of polyethylene, blended with non silane-modified polypropylenes, with or without an additional material added as a compatibilising agent for the polyolefin and polypropylene.

In the method of the present invention, one or more polypropylene homopolymners, or copolymers of polypropylene with an olefin other than polypropylene, are blended with one or more polyolefins, preferably polyethylenes or copolymers of polyethylene, previously reacted with silane to create silane-grafted polyolefins. Alternatively, the silane may be incorporated during polymerisation of the polyolefin to produce silane-olefin copolymers. Polyolefins reacted with silane by either of these methods are referred to in this document as silane-modified polyolefins.

U.S. Pat. No. 5,929,129 describes a process of blending a silane-grafted polyolefin with a non silane-grafted polypropylene, but this is limited to materials required for the manufacture of foamed articles, said materials being unsuitable for the manufacture of the preferred articles of this invention due to an insufficient level of crosslinking and blend mixture-compatibility.

Suitable polyolefins in this invention would include those materials known in the industry as low density polyethylene, high density polyethylene, linear low density polyethylene; copolymers of polyethylene, including those based on ethylene-butene, ethylene-hexene, ethylene-octene, ethylene-vinyl-acetate, ethylene-methyl-acrylate, ethylene-ethyl-acrylate, ethylene-butyl-acrylate, and similar materials; and ethylene-propylene or ethylene-propylene diene elastomers; and, in particular those of the above prepared using so-called metallocene catalysts.

Alternatively, one or more additional materials may be incorporated to act as compatibilising agents for the silane-modified polyolefin and the polypropylene. Such materials would include the polypropylenes and polyolefin materials described above; polyolefins modified with reactive functional groups, such as acrylic acids, methacrylic acids, acrylates, methacrylates and anhydrides; and block copolymers, such as styrene-butadiene, styrene-butadiene-styrene, styrene-ethylene/propylene and styrene-ethylene/butylene-styrene.

The blended composition is then formed into the desired article by melt processing techniques such as extrusion and moulding, including multi-layer processing, for example co-extrusion of the blend with another material to form discrete but intimately bonded layers. The article thus formed is cross-linked in the presence of a silanol condensation catalyst under suitable conditions of heat and moisture, the catalyst being either blended with the composition during melt processing or added subsequently by coating the formed article, for example. The crosslinking thus performed also helps to stabilise the physical structure of the mixture of polypropylene with the polyolefin contained in the silane-modified polyolefin composition.

Accordingly, in one aspect, the present invention provides a heat shrinkable coating material of a crosslinked composition comprising a silane-modified, preferably silane-grafted, polyolefin and non silane-modified polypropylene, said material being formed by a process comprising: (a) reacting a polyolefin with a silane to form a silane-grafted polyolefin or silane-olefin copolymer; (b) blending the silane-modified polyolefin produced in (a) with the polypropylene homopolymer or copolymer and a silanol condensation catalyst; (c) forming the coating or insulating material by melt processing the mixture formed in step (b); and (d) crosslinking the coating or insulating material by exposing it to combined heat and moisture.

DETAILED DESCRIPTION OF PREFERRED EMBODIMENTS

The crosslinking of polymers, in particular polyolefins, by the combined process of chemical grafting of silane molecules onto the polymer to form a silane-grafted resin, followed by catalysed hydrolysis and condensation of the silane, is a well known and established process, such as is described in U.S. Pat. No. 3,646,155, which is incorporated herein by reference in its entirety.

The preferred polyolefins for use in the compositions of the present invention include polyethylene or co-polymers of ethylene prepared by polymerising ethylene with one or more of an unsaturated olefin monomer having from 3 to 20 carbon atoms, preferably propylene, butylene, hexene or octene, a substituted olefin such as vinyl acetate, methyl acrylate, ethyl acrylate or butyl acrylate, or a diene monomer, such as ethylidene norbornene. The polyolefin is preferentially present in the form of high-density polyethylene, linear low-density polyethylene or an ethylene-octene copolymer polymerised using a so-called metalocene catalyst. Preferably, the polyolefin resin comprises about 50 to 100% by weight ethylene, more preferably about 60 to 90% by weight ethylene, and most preferably about 80 to 95% by weight ethylene.

Preferably, the density of the polyethylene or the ethylene co-polymer is in the range of about 0.85 to about 0.95 g/cm$^3$.

The polyolefins as described above are reacted in the molten state with an organic silane having the general formula RR'SiY$_2$, wherein R represents a monovalent olefinically unsaturated hydrocarbon radical, Y represents a hydrolysable organic radical and R' represents an R radical or a Y radical. The monovalent olefinically unsaturated hydrocarbon radical preferably comprises vinyl, allyl, butenyl, cyclohexenyl, cyclopentadienyl, or cyclohexadienyl radicals.

The group Y may represent any hydrolysable organic radical, for example an alkoxy radical such as methoxy, ethoxy and butoxy radicals; an acyloxy radical, for example the formyloxy, acetoxy or propionoxy radicals; oximo radicals such as —ON=C(CH$_3$)$_2$, —ON=CCH$_3$C$_2$H$_5$ and ON=C(C$_6$H$_5$)$_2$; or substituted amino radicals such as alkylamino and arylamino radicals, examples of which are —NHCH$_3$, —NHC$_2$H$_5$ and —NH(C$_6$H$_5$)$_2$.

Preferably, the silane has general formula RSiY$_3$, with the most preferred group R being the vinyl radical, and the most preferred Y group being the methoxy and ethoxy radical. Accordingly, the most preferred silanes for use in the present invention are vinyltriethoxysilane and vinyltrimethoxysilane.

The amount of silane reacted with the polyolefin depends in part upon the reaction conditions and the degree of modification desired in the polyolefin. The proportion may vary from about 0.1 to about 50% by weight based on the total weight of the silane-grafted resin, more preferably from about 0.5 to 10% by weight, and most preferably from about 1.0 to 2.5% by weight.

A free-radical initiator is also incorporated into the polyolefin to initiate the graft polymerization reaction. Most preferred free-radical initiators are organic peroxides such as benzoyl peroxide, dichlorobenzoyl peroxide, dicumyl peroxide, di-tertiary butyl peroxide. The most preferred free-radical initiator for use in the compositions of the present invention is dicumyl peroxide. The criteria for choosing an appropriate free-radical initiator are known to persons skilled in the art and are described in the above-mentioned U.S. Pat. No. 3,646,155 and will not be repeated here.

Preferably, the organic peroxide free-radical initiator is added in an amount of from about 0.1 to about 1.0% by weight of the silane-grafted resin, more preferably from about 0.05 to 0.2% by weight.

The silane and peroxide are reacted with the polyolefin above the melting point of the polyolefin under conditions in which the polyolefin is subjected to mechanical working, using processes known to those skilled in the art.

Alternatively, the silane-modified polyolefin may be prepared by copolymerising an unsaturated olefinic monomer, such as ethylene, with an unsaturated silane monomer containing one or more hydrolysable groups, such as vinyltrimethoxy silane, as is disclosed in U.S. Pat. No. 4,413,066, for example.

The silane-modified polyolefin, or polyolefins, so produced by either of the above two methods is/are subsequently melt-processed as described previously, with an amount of one or more polypropylenes and a silanol condensation catalyst, and optionally with one or more of a number of other ingredients, such as pigmenting agents, minerals fillers, flame-retardant additives, antioxidants, stabilisers, lubricants, compatibilisers and the like, to form a composition according to the invention.

The polypropylene or polypropylenes may be selected from any of the classes known as homopolymers or copolymers, being preferentially isotactic in nature, with a melt viscosity chosen to be similar and comparable in value to the silane grafted polyolefin, for maximum process compatibility, and being preferably added in an amount of from about 10 to about 90 percent by weight of the composition, more preferably from about 20 to about 80 percent by weight, and most preferably from about 40 to about 60 percent by weight.

The silanol condensation catalyst is typically selected from the group comprising organic bases, carboxylic acids and organometallic compounds including organic titanates and complexes or carboxylates of lead, cobalt, iron, nickel, zinc and tin. Preferably, the catalyst is selected from dibutyltin dilaurate, dibutyltin diacetate, dibutyltin octanoate, dioctyltin maleate, dibutyltin oxide and titanium compounds such as titanium-2-ethylhexoxide. The most preferred silanol condensation catalyst is dibutyltin dilaurate, though any material which will catalyse the silane condensation reaction is suitable for the invention. The condensation catalyst is preferably added in an amount of from about 0.01 to about 1 percent by weight of the coating material, more preferably about 0.05 to about 0.5 percent by weight, and most preferably about 0.1 to 0.2 percent by weight.

The compatibilising agent may be selected from any of the polypropylenes and polyolefin materials described above, polyolefins modified with reactive functional groups, such as acrylic acids, methacrylic acids, acrylates, methacrylates and anhydrides, and block copolymers, such as styrene-butadiene, styrene-butadiene-styrene, styrene-ethylene/propylene and styrene-ethylene/butylene-styrene. Preferred compatibilisers include polyolefins grafted with maleic anhydride or acrylic acid, ethylene-propylene elastomers, and metallocene-catalysed polyolefin resins. The compatibilising agent is preferably added in an amount from about 1 to 50 percent by weight.

Subjecting the composition thus produced to moisture, preferably at an elevated temperature, will induce crosslinking of the silane groups via a combined hydrolysis and condensation reaction. Atmospheric moisture is usually sufficient to permit the crosslinking to occur, but the rate of crosslinking may be increased by the use of an artificially moistened atmosphere, or by immersion in liquid water. Also, subjecting the composition to combined heat and moisture will accelerate the crosslinking reaction. Most preferably, crosslinking is effected at a temperature above 50° C. and most preferably by exposing the composition to a temperature of 85° C. and a relative humidity of 90% for approximately 100 hours.

A particularly preferred process for forming a composition of the present invention will now be described below.

The polyolefin, silane, peroxide free-radical initiator and optional processing stabiliser are pre-blended and passed through an extruder at a temperature above the melting point of the polyolefin and decomposition temperature of the peroxide, in order to accomplish grafting of the silane onto the polyolefin. The grafted material is then passed through a multi-strand dye into a trough of cooled water and is subsequently chopped into pellets with a strand pelletizer and dried.

The grafted polymer pellets are then blended with a quantity of polypropylene as described above, the silane condensation catalyst, an antioxidant stabiliser, as well as any number of optional ingredients, including colorants, fillers, flame retardants, compatibilisers, and processing aids, and melt processed, for example, extruded, co-extruded or moulded, to the desired shape.

The material so processed is then exposed to moisture, preferably at an elevated temperature, to effect crosslinking of the material.

The composition of the invention thus produced exhibits the property of softening but not melting when re-heated above its softening point or crystalline melting point. This is desirable for the manufacture of heat-shrinkable articles since the polymer may be stretched beyond the original extruded or moulded dimensions without rupture using relatively low forces, and can then be frozen in the stretched state by cooling it rapidly to below the melting point. Stretching can be accomplished by mechanical, pneumatic or hydraulic means. At this point the stretched crosslinks are held in a stable state by the re-formed, solid crystalline regions. Subsequent re-heating of the stretched article above the melting point will cause the crystalline regions to re-melt and the structure to revert to its original extruded or moulded dimensions. The crosslinking also prevents the article from becoming liquid during this shrinking process.

The invention is further illustrated by the following Examples:

EXAMPLE 1

A metallocene-catalysed, ethylene octene copolymer with copolymer content 14 percent, density 0.902, and melt index 4.3, was grafted with about 2% vinyl triethoxysilane according to the general procedure described above and known to those skilled in the art.

EXAMPLE 2

This example describes the production of a crosslinked, extruded sheet according to the present invention.

The grafted pellets produced according to Example 1 were blended with the ingredients indicated in Table 1, namely polypropylene, antioxidant and dibutyltin dilaurate as the condensation catalyst. The combined ingredients were fed at a melt temperature of approximately 180° C. through a 24:1 L/D single screw extruder equipped with a single layer sheet die. The extruded sheet was fixed to the required dimensions of width and thickness by passing it through a cooled, 3-roll calendering stack, then wound onto reels.

The sheet was crosslinked by conditioning the reeled sheet at a temperature of 85° C. and a relative humidity of 90% for approximately 100 hours. This crosslinked sheet was then tested to determine the degree of crosslinking and for mechanical properties as indicated in Table 2.

TABLE 1

| Moisture-Crosslinkable, Polypropylene Material | |
|---|---|
| Ingredient | Percent by Weight |
| Silane-Grafted Polyolefin | 39.2 |
| Polypropylene Homopolymer* | 56.8 |
| Antioxidant** | 2 |
| Dibutyltin Dilaurate*** | 2 |

*Density 0.89 g/cm3 and melt index 2.0
**Blend of hindered phenol and phosphite stabiliser
***Added as a 2% masterbatch in polyethylene

TABLE 2

| Test Results For Crosslinked Sheet | |
|---|---|
| Property | Value |
| Gel Fraction (% degree of crosslinking) | 40 |
| Hot Tensile Strength @ 200C and 100% Elongation (psi) | 11.3 |
| Ultimate Hot Elongation @ 200C (%) | 450 |
| Ultimate Tensile Strength @ 23C (psi) | 4500 |
| Ultimate Elongation @ 23C (%) | 620 |
| Flexural Modulus (psi) | 55000 |

EXAMPLE 3

This example describes the production of a heat-shrinkable, extruded sheet product according to the present invention.

The crosslinked sheet prepared in Example 2 was re-heated to above the softening point and mechanically stretched in the longitudinal direction on an apparatus designed specifically for this purpose. The stretched sheet was mechanically tested for suitability as a heat-shrink coating for high-temperature pipeline joints to specifications common to the industry.

EXAMPLE 4

In another example, a 2% silane-grafted, linear low density polyethylene (LLDPE), of density 0.922 and melt index 1.0, was blended with the polypropylene and dibutyltin dilaurate catalyst from Example 2, with and without the addition of a compatibiliser, as shown in Table 3.

Crosslinked sheet was prepared as described in Example 2 and tested for the properties indicated in Table 4.

TABLE 3

Moisture Crosslinkable Polypropylene With And Without Compatibiliser

| | Addition Level | |
|---|---|---|
| Ingredient | Without Compatibiliser | With Compatibiliser |
| Silane-Grafted LLDPE | 40 | 40 |
| Polypropylene | 60 | 60 |
| Dibutyltin Dilaurate | 1.5 | 1.5 |
| Compatibiliser* | — | 5 |

*Polyethylene grafted with 0.33% maleic anhydride-density 0.93 g/cm3, melt index 2.5.

TABLE 4

Test Results For Crosslinked Sheet

| | Value | |
|---|---|---|
| Property | Without Compatibiliser | With Compatibiliser |
| Gel Fraction (% degree of crosslinking) | 30 | 30 |
| Hot Tensile Strength @ 200C and 100% Elongation (psi) | 11 | 7.2 |
| Ultimate Hot Elongation @ 200C (%) | 290 | 290 |
| Ultimate Tensile Strength @ 23C (psi) | 2900 | 3100 |
| Ultimate Elongation @ 23C (%) | 400 | 480 |

The sample with compatibiliser exhibits superior room temperature tensile strength and elongation, typical of a more homogeneous blend.

Preferably, materials according to the invention have a gel fraction greater than about 25 percent, more preferably greater than about 30 percent, and even more, preferably greater than about 35 percent.

Although the invention has been described in relation to certain preferred embodiments, it will be appreciated that it is not intended to be limited thereto. Rather, the invention is intended to encompass all embodiments which fall within the scope of the following claims.

What is claimed is:

1. A coating or insulating material comprising a crosslinked composition containing silane-modified polyolefin and non silane-modified polypropylene homopolymer or copolymer, said material being formed by a process comprising:
   (a) creating a mixture of silane-grafted polyolefin, or silane-olefin copolymer, with polypropylene and a silanol condensation catalyst, and optional additional ingredients required to impart suitable product processing, mixture compatibility, and performance characteristics;
   (b) forming the coating material by melt processing the mixture prepared in step (a); and
   (c) crosslinking the coating material by exposing it to moisture, at elevated temperature.

2. A coating or insulating material according to claim 1, wherein said material is a heat-shrinkable material, and wherein said process includes the following step after said step (c):
   (d) stretching said material above its softening or melting point, and then freezing said material in its stretched form to form a heat-shrinkable article.

3. The coating or insulating material according to claim 1, wherein the polyolefin is selected from the group comprising polyethylene and copolymers of ethylene with an olefin having from 3 to 20 carbon atoms.

4. The coating or insulating material according to claim 1, wherein the polyolefin comprises a copolymer of ethylene with one or more of propylene, butylene, hexene and octene, ethylidene norbornene, vinyl acetate, methyl acrylate, ethyl acrylate and butyl acrylate.

5. The coating or insulating material according to claim 2, wherein the density of the polyolefin is from about 0.85 to about 0.95 g/cm$^3$.

6. The coating or insulating material according to claim 1, wherein the polypropylene is selected from the group comprising both polypropylene homopolymers, or copolymers of propylene with an olefin other than propylene, of density from about 0.86 to 0.90, and with a melt viscosity similar to the silane-modified polyolefin.

7. The coating or insulating material according to claim 1, wherein the silane has the general formula RR'SiY$_2$ wherein R represents a monovalent olefinically unsaturated hydrocarbon or hydrocarbonoxy radical, Y represents a hydrolysable organic radical and R' represents an R radical or a Y radical.

8. The coating or insulating material according to claim 7, wherein the monovalent olefinically unsaturated hydrocarbon or hydrocarbonoxy radical is selected from the group comprising vinyl, allyl, butenyl, cyclohexenyl, cyclopentadienyl, and cyclohexadienyl.

9. The coating or insulating material according to claim 7, wherein Y represents a hydrolysable organic radical selected from the group comprising methoxy, ethoxy, butoxy, formyloxy, acetoxy and propionoxy; an oximo radical selected from the group comprising —ON=C(CH$_3$)$_2$, —ON=CCH$_3$C$_2$H$_5$ and ON=C(C$_6$H$_5$)$_2$; or a substituted amino radical selected from the group comprising alkylamino and arylamino radicals, with said arylamino radical being selected from the group comprising —NHCH$_3$, —NHC$_2$H$_5$ and —NH(C$_6$H$_5$).

10. The coating or insulating material according to claim 7, wherein the silane has general formula RSiY$_3$, with R being vinyl and Y being methoxy or ethoxy.

11. The coating or insulating material according to claim 7, wherein the silane-modified polyolefin contains from about 1.0 to about 2.5 percent of silane monomer by weight of the silane-grafted resin.

12. The coating or insulating material according to claim 1, wherein the free-radical initiator is an organic peroxide.

13. The coating or insulating material according to claim 1, wherein the polypropylene is added to the mixture of step (a) in an amount of from about 20 to about 80 percent by weight of the coating material.

14. The coating or insulating material according to claim 1, wherein the silanol condensation catalyst is selected from the group comprising dibutyltin dilaurate and dibutyltin oxide.

15. The coating or insulating material according to claim 14, wherein the silanol condensation catalyst is added to the mixture of step (a) in an amount of about 0.05 to 0.2 percent by weight of the coating or insulating material.

16. The coating or insulating material according to claim 1, additionally comprising ingredients selected from one or more members of the group comprising antioxidants, fillers, colorants, UV stabilizers, compatibilisers and lubricants.

17. The coating or insulating material according to claim 1, wherein the compatibiliser is selected from the group comprising polypropylenes and polyolefin materials; copolymers of ethylene and propylenes selected from ethylene-propylene or ethylene-propylene diene elastomers; polyolefins modified with reactive functional groups selected from acrylic acids, methacrylic acids, acrylates, methacrylates and anhydrides; and block copolymers selected from styrene-butadiene, styrene-butadiene-styrene, styren-ethylene/propylene and styrene-thylene/butylene-styrene.

18. The coating or insulating material according to claim 1, wherein the compatibiliser is added to the mixture of step (a) in an amount from about 1 to 50 percent by weight of the coating or insulating material.

19. A heat shrinkable coating or insulating material comprising a crosslinked composition containing a silane-modified polyolefin and a non silane-modified polypropylene homopolymer or copolymer, said material being formed by a process comprising:

(a) creating a mixture of silane-grafted polyolefin, or silane-olefin copolymer, with polypropylene and a silanol condensation catalyst, and optional additional ingredients required to impart suitable product processing, mixture compatibility, and performance characteristics;

(b) forming the coating material by melt processing the mixture prepared in step (a);

(c) crosslinking the coating material by exposing it to moisture, at elevated temperature; and;

(d) stretching said material above its softening or melting point, and then freezing said material in its stretched form.

20. A method for producing a heat shrinkable coating or insulating material comprising a crosslinked composition containing a silane-modified polyolefin and a non silane-modified polypropylene homopolymer or copolymer, said process comprising:

(a) creating a mixture of silane-grafted polyolefin, or silane-olefin copolymer, with polypropylene and a silanol condensation catalyst, and optional additional ingredients required to impart suitable product processing, mixture compatibility, and performance characteristics;

(b) forming the coating material by melt processing the mixture prepared in step (a);

(c) crosslinking the coating material by exposing it to moisture, at elevated temperature; and;

(d) stretching said material above its softening or melting point, and then freezing said material in its stretched form.

* * * * *